United States Patent [19]
Fickler

[11] Patent Number: 4,614,128
[45] Date of Patent: Sep. 30, 1986

[54] LINEAR DRIVE DEVICE WITH TWO MOTORS

[75] Inventor: Hans Fickler, Wiesendangen, Switzerland

[73] Assignee: Lars International S.A., Luxembourg, Luxembourg

[21] Appl. No.: 522,226
[22] PCT Filed: Dec. 7, 1982
[86] PCT No.: PCT/CH82/00129
§ 371 Date: Aug. 11, 1983
§ 102(e) Date: Aug. 11, 1983
[87] PCT Pub. No.: WO83/02141
PCT Pub. Date: Jun. 23, 1983

[30] Foreign Application Priority Data
Dec. 18, 1981 [CH] Switzerland .......................... 8103/81
Aug. 24, 1982 [CH] Switzerland .......................... 5025/82

[51] Int. Cl.[4] ............................................. F16H 1/10
[52] U.S. Cl. ........................... 74/424.8 B; 74/424.8 R; 74/89.15
[58] Field of Search ........ 74/89.15, 424.8 R, 424.8 B, 74/665 A; 310/80, 83, 112

[56] References Cited
U.S. PATENT DOCUMENTS

| 2,481,477 | 9/1949 | Peery | 74/625 X |
| 2,630,022 | 3/1953 | Terdina | 74/424.8 B |
| 2,860,266 | 11/1958 | Schrader | 74/424.8 B |
| 3,407,680 | 10/1968 | Westmoreland | 74/424.8 B |

Primary Examiner—Stephen F. Husar
Attorney, Agent, or Firm—Shlesinger Arkwright Garvey & Fado

[57] ABSTRACT

The linear drive device operates with two motors which are mounted on the outer ends of two housing parts which are locked against rotation and can be telescopically moved into each other. A motor drives a nut over a driving sleeve. The other motor drives a threaded rod. By means of this design, a compact drive device is procured in the case of which all mechanical parts are located inside of the housing.

21 Claims, 10 Drawing Figures

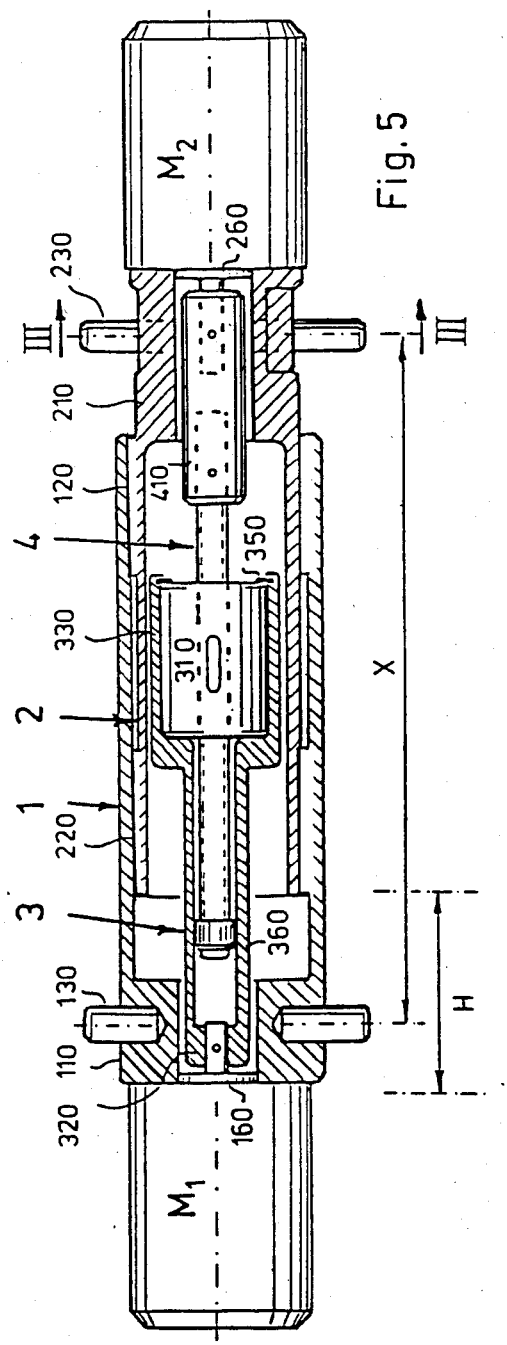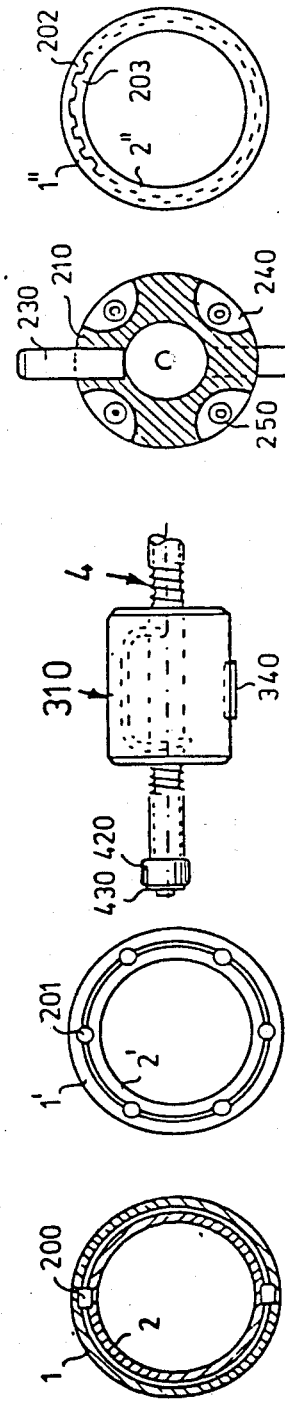

LINEAR DRIVE DEVICE WITH TWO MOTORS

BACKGROUND OF THE INVENTION

The invention refers to a linear-drive device with two motors, in the case of which one motor drives a nut and the other motor drives a threaded rod. Such a device has the advantage of a much larger regulation range for thrust velocity compared with a device which works only with one motor, which for example drives the spindle.

A crawling, very slow thrust can be achieved if both motors have the same rotational direction, but are operated with a slight revolution speed difference.

A rapid thrust can be achieved if only one motor is operated and the other motor stands still and finally, a very rapid thrust can be achieved if the motors are operated contrarotating.

STATE OF THE ART

U.S. Pat. No. 2,630,022 (Terdina) shows a linear drive device with two motors in open design. The motor axes run vertical to the spindle axle and drive the spindle or the nut each over their own worm gear. Due to this, the design effort is relatively great and no clean compact design of the device can be achieved. The use of the drive in aircraft is proposed in the invention, whereby it is pointed out as special advantage that the drive still remains operational if one of the two motors fails. Of course this applies for all such linear drive devices, if these are operated with two motors.

U.S. Pat. No. 2,481,477 (Peery) shows a double-motored linear drive mechanism, in the case of which one motor directly drives the spindle. The motor, which drive the nut, lies beside the spindle and drives the nut over a drive gear.

OBJECT OF THE INVENTION

It is the object of the invention to procure a linear drive device with two motors, which exhibits an esthetic, mechanically clear, simple design and one which is inexpensive to manufacture. The mechanical parts should be located in a closed housing and they should be protected from getting dirty. In order that each thrust movement can take place free of clearance and without delay, intermediate gears such as gear wheels or worm gears are to be avoided if possible.

The device should exhibit as small friction losses as possible and should be able to exert full thrust force or propelling force immediately from a standstill.

DESCRIPTION OF THE DRAWINGS

FIG. 5 is a side view with a partial cut-away section of a unit having a motor at each end thereof.
FIG. 6 is a side view of the ball rotating nut assembly.
FIG. 7 is a cross-sectional view along line 7—7 of FIG. 5.
FIG. 8 is a sectional view of the telescoping assembly of a modification of FIG. 5 employing a wedge.
FIG. 9 is a cross-sectional view of a telescoping tube assembly in which ball elements are used.
FIG. 10 is a cross-sectional view of another modification showing in cross-section the telescoping tubes inward lengthwise grooves are employed.

THE INVENTION

Figure 1:
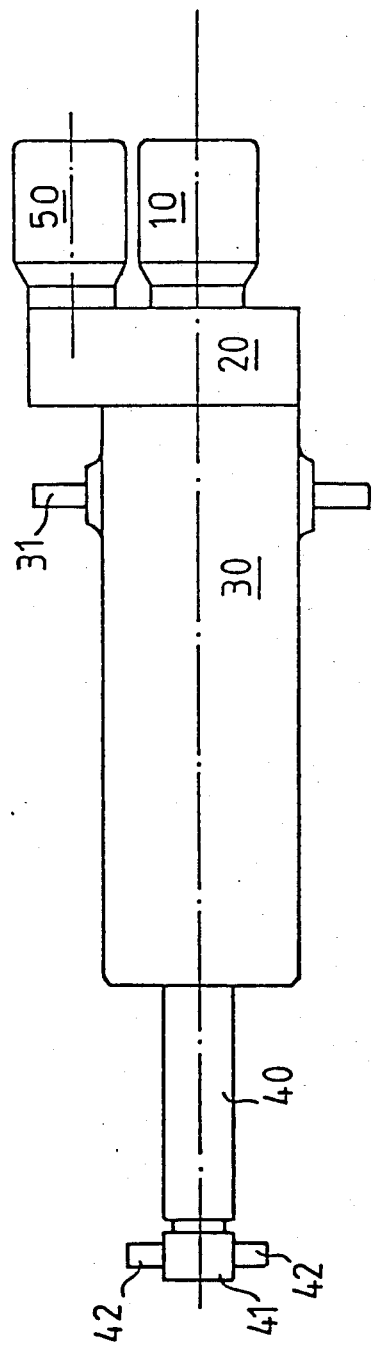
FIG. 1 is a side view of a two electromotor assembly.

The invention solves the set object with a linear thrust device. Different design forms are possible. The nut can be mounted non-rotating, but axially shiftable in the drive tube. It then drives a connecting rod extending out of the housing. But the nut can also be arranged firmly on the end of the drive tube and then drives two housing parts which can be moved telescopically into each other.

In the following, some design examples will be described concerning the object of the invention on the basis of the drawing:

DESCRIPTION OF THE INVENTION

The linear thrust device shown in FIG. 1 has two electromotors 10 and 50 which are designed on housing part 20, in which a gear unit 20 is housed. Another housing part 30 is connected to housing 20, in which there is the actual thrust device with nut and threaded rod. The connecting rod 40 extends out of housing 30, and this connecting rod 40 is provided with a rotatable head 41. Head 41 and housing 30 are both provided with pivots 42 and 31 in order to be able to mount the linear thrust device in a rotatable manner in the case that it carries out a rotating movement in operation. Of course it cannot be kept rotatable.

Figure 2:
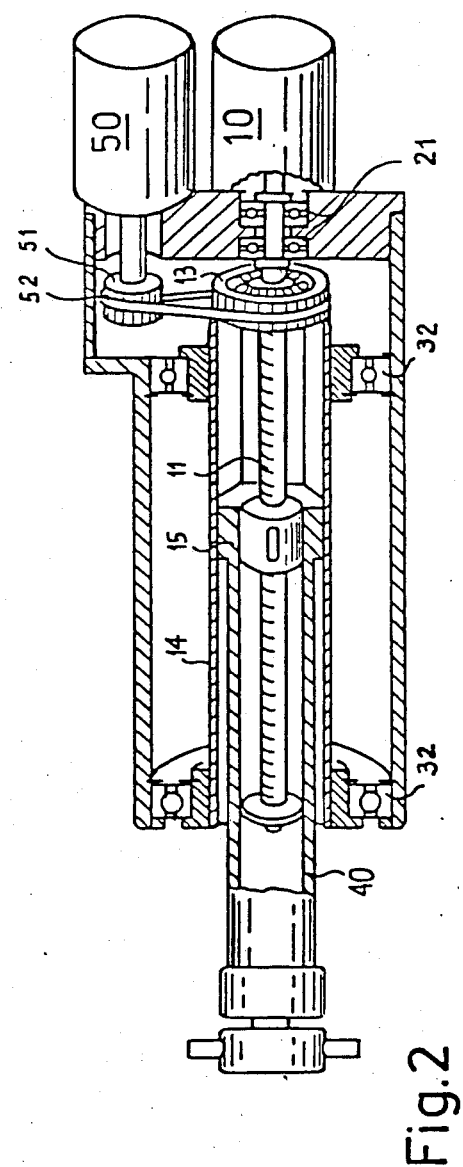
FIG. 2 is a partial cut-away view of FIG. 1.

How the linear thrust mechanism works can be described on the basis of the simplified lengthwise cross section according to FIG. 2. The electromotor 10 directly drives the threaded rod 11. A toothed belt pulley 13 is mounted in a rotatable manner on the backside continuation of the threaded rod 11. This toothed belt pulley 13 is driven by the second motor 50 through toothed belt pulley 51 and by the toothed belt 52 looped around both wheels 13 and 51. The toothed belt pulley 13 is firmly connected with the hexagonal drive tube 14, which is mounted in a rotatable manner in housing 30.

Both bearings are designated by 32. The nut 15 connected with the hollow connecting rod 40 is arranged in a shiftable manner in this hexagonal tube 14. In order that the connecting rod 40 which rotates during operation can take up axial forces, the rod 11, on which nut 15 is supported, is mounted in housing 20 rotatably by means of both thrust bearings 21, but axially fixed in the housing part 20. The thrust bearing could also be housed in the housing of motor 10.

The diameter—or the number of teeth ratio between the two toothed belt pulleys 51 and 13—should be equal to one to two. If motor 10 makes 1440 rpm and motor 50 makes 2880 rpm, both motors are driven in the same rotational direction, which means that threaded rod 11 as well as the nut 15 driven by drive tube 14 rotate at 1440 rpm, and the thrust velocity is equal to zero. If the rotational speed of motor 50 is reduced, the nut rotates more slowly than the rod and the connecting rod 40 is driven forward. If on the other hand the rotational speed of motor 50 is increased or the rotational speed of motor 10 is reduced, the connecting rod 40 is drawn back. For example if the motor 10 is braked to a stop, the threaded rod 11 stands still and the nut is braked to a stop, the threaded rod 11 stands still and the nut is driven at 1440 rpm. If the pitch of the threading of the threaded rod amounts to 4 mm, the withdrawal speed of the connecting rod is 1440×4=5760 mm/min or 95 mm/second. The behavior is reversed when motor 50 is braked to a stop. Then the thrust speed amounts to 95 /mm sec.

Preferably, a rotational speed regulation device is provided for only one motor. For example, one could use a motor 10, which runs constantly with 1000 rpm, while the rotational speed of motor 50 is regulatable between 1000 rpm and 3000 rpm. With the mechanical "step up" of 1:2 of gears 52 and 13, this gives a regulation range for relative rotational speed per minute between nut 15 and threaded rod of +500 over zero to −500. At a pitch thread of 4 mm this would give a thrust speed regulation range of the connecting rod of +500/60×4=33.3 mm/sec. over standstill up to −33.3 mm/seconds.

Figure 3:
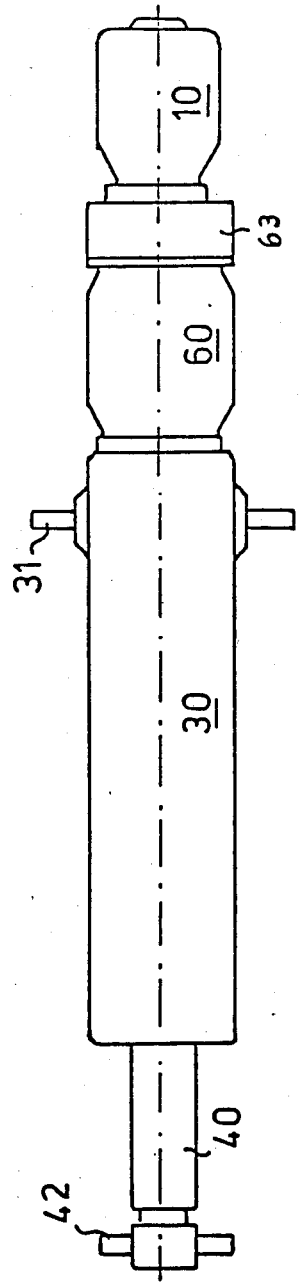
FIG. 3 is a side view of a single motor unit.
Figure 4:
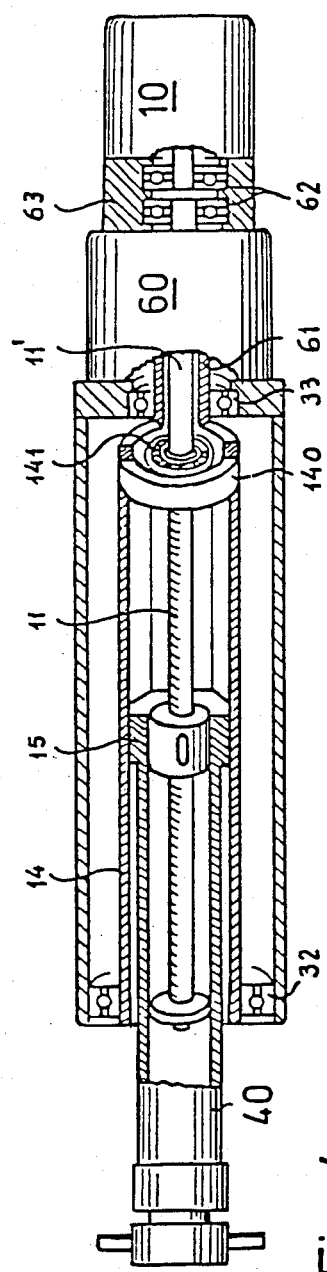
FIG. 4 is a partial cut-away view of FIG. 3.

FIGS. 3 and 4 show a variation of the previously described linear thrust device. Admittedly it is different in design but it is very similar to the device according to FIGS. 1 and 2 in how it works. Thus the same reference numbers as before are used for parts of the same type.

The hexagonal drive tube is driven directly by motor 60 instead of over an intermediate drive. For this purpose, the rear end of tube 14 is provided with a coupling piece 140, which goes over into the hollow shaft 61 of motor 60. The threaded rod is mounted swivellably in this coupling piece 140 by means of a radial ball bearing 141. The continuation 11 of threaded rod 11 is conducted through hollow shaft 61 of motor 60 and rotatably but axially firmly held in intermediate piece 63 by means of thrust bearings 62. The continuation 11' of the threaded rod is connected with the shaft of motor 10.

If both motors 10 and 60 run with the same rotational speed and in the same rotational direction, they drive the threaded rod 11 and the drive tube 14, which also moved nut 15, with the same rotational speed and thus the thrust speed of the connecting rod 40 is equal to zero.

For example, if motor 10 is designed as a motor with regulatable rpms, or connected with a not shown, for example electronic regulating mechanism, thrust and drawing back of the connecting rod can be regulated from a standstill. The thrust or drawing back speed changes proportionally to the difference of the rotational speeds of both motors 10 and 60.

Naturally, it is also possible to brake one of the two motors to zero in order to achieve a very rapid thrust or a very rapid drawing back of the connecting rod, 40. The thrust of drawing back speed is quite extreme if the rotational direction of a motor is reversed.

The drive of the linear thrust device with two motors has the eminent advantage over the drive with only one motor in that the full power is available already from a standstill. Both motors run even when connecting rod 40 stands still.

In the case of a linear thrust device, which works with only one motor, the motor must first start up before it can give off its full power.

The linear drive device according to FIG. 5 includes two tubular housing parts 1 and 2 which can be shoved into each other telescopically, whose outer end is reinforced at 110 or 210. Engine $M_1$ or $M_2$ is fastened on these reinforced ends. The bushing 220 on the inner tube 2 and the bushing 120 mounted in outer tube 1 provide the exact guidance.

Pivots 130, 230 are mounted on the reinforced ends 110, 210, with the aid of which the drive device can be connected with the parts to be actuated by it.

FIG. 7 shows a cross section along line III—III in FIG. 5 from which it is evident that the reinforced housing end 210 is provided with recesses 240, in which inner hexagonal screws 250 are located, with which motor $M_2$ is fastened. Motor $M_1$ is fastened on the reinforced housing end 110 by screws mounted inside housing part 1 (which are not shown in order not to make the drawing to detailed). The motor flanges of both motors $M_1$ and $M_2$ have a collar 160 or 260, with which they are precisely centered in reinforced housing end 110 or 210.

The housing parts 1 and 2 must also be assured against turning. A solution for this is shown in FIG. 8, in the case of which two lengthwise grooves are mounted in the outside tube 1 and two sliding wedges 200 are made in the inside tube 2.

FIGS. 9 and 10 show other solutions. In the case of the solution according to FIG. 9, raceways running parallel to the tube axis are mounted in the outer tube 1' and in the inner tube 2', in which bearings 201 run. Such a guidance is precise and nevertheless has an easy action.

In FIG. 10, the outer tube 1" is provided with a number of lengthwise grooves, which form a type of inner toothing 202 and the inside tube 2" is provided with a corresponding outside toothing 203. Such a guidance can take up large forces.

Instead of using round housing parts telescopically movable into each other, parts 1, 2 can also exhibit a polygonal cross sectional profile, for example a square or hexagonal profile. Due to this, special means for securing against turning is superfluous.

Motor $M_1$ drives a ball rotating nut 310 by means of drive tube 3. One end 320 of drive tube is firmly connected with the shaft of motor $M_1$, the other end 330 is widened in a bell-shaped manner, so that ball rotating nut 310 finds a place therein. It is pressed into this end, secured against rotation by wedge 340 and also secured against shifting by a safety ring 350. In the part of the drive tube 360 lying between both ends, the end of threaded rod 4 is shiftable and mounted rotatably.

Motor $M_2$ drives the threaded rod 4. For this purpose, the shaft of motor $M_2$ is connected with the end of rod 4 by means of coupling sleeve 410. The threaded rod 4 has a thread corresponding to the bearings of ball rotating nut 310, as shown in FIG. 6. The free end of threaded rod 4 is provided with a bushing 420 rotatable on the spindle end, which is held axially by a safety ring 430. The outside diameter of bushing 420 is dimensioned in such a way that it can be slid into drive tube 360.

This additional mounting on the free end of the threaded rod is very important since it prevents rotating of the threaded rod at high rotational speeds.

In operation, one can work with one or both motors $M_1$ and $M_2$. A crawling, a medium or a rapid thrust is achieved accordingly. By thrust, we mean an increase of interval x (FIG. 1) as well as a reduction. For example, it is possible to design the thrust in direction of increase of internal x as crawling (by the operation of both motors but with a small rotational speed difference) and the thrust very rapid in opposite direction (by the operation of both motors in opposite direction). This was mentioned already in the introduction. The guides 120, 220 of tubes 1, 2, the length of the spindle and the axial length of the nuts 310 limit the maximum thrust length that is to say the stroke, to dimension H (FIG. 5).

With the use of a ball rotating nut with a corresponding threaded rod, highly precise thrust devices can be produced which work without clearance. Naturally, the motor shafts must be mounted free of clearance both radially and axially. In cases where precision is less important and price is more important, a simple bronze nut or a plastic nut can be used instead of a ball rotating nut.

Instead of radial pivots 130, 230 as application point for force transmission, many other solutions are possible. For example, the outer bearing brackets or plates of motors $M_1$, $M_2$ can be provided with application eyelets.

What is claimed is:

1. A linear drive device with a threaded rod and a coacting nut, comprising a cylindrical housing, a first drive motor mounted at one end of the housing, a rotatably mounted threaded rod connected at one end thereof to the first drive motor drive shaft, a driving nut disposed on the threaded rod and within the cylindrical housing, a cylindrical drive tube disposed within the housing and connected to the drive nut which is coaxially mounted with respect to the threaded rod, and a driving motor connected to one end of the driving tube for imparting rotational movement thereto whereby the relative movement of the threaded rod transmits a driving axial movement thereto.

2. Linear drive device according to claim 1, characterized by the fact that the second motor (50; 60) drives nut (15) with the aid of a drive tube (14) in which it is mounted non-rotatably but axially shiftable.

3. Linear drive device according to claim 1, characterized by the fact that the second motor ($M_1$) drives said nut (310) with the aid of said drive tube (3) on the outer end of which it is firmly arranged.

4. Linear drive device according to claim 2, characterized by the fact that both motors (10, 50; 10, 60) are arranged on the end of a housing (30), and that the nut (15) is connected with a connecting rod (40) jutting out of housing (30), mounted in an axially shiftable manner in the drive tube, running coaxially with the drive tube (14).

5. Linear drive device according to claim 4, characterized by the fact that both motors (10, 50) are arranged beside each other, and that the second motor (50) drives the drive tube (14) with the aid of an intermediate drive (13, 51, 52).

6. Linear drive device according to claim 4, characterized by the fact that both motors (10, 60) are designed coaxially on each other, whereby the outermost motor (10) drives the rod, while the second motor (60) has a hollow shaft with a threaded rod (11, 11') through it, which is firmly connected with the drive tube (14).

7. Linear drive mechanism according to claim 3, characterized by the fact that the motors ($M_1$, $M_2$) are arranged on opposite lying ends (110, 210) of a housing, which included two parts (1, 2) locked against rotating around their axis, and movable into each other telescopically, whereby said first motor ($M_2$) is firmly connected with the threaded rod (4), said second motor ($M_1$) is firmly connected with said drive tube (3), the end of which (330) bears said nut (310).

8. Linear drive device according to claim 6, characterized by the fact that the continuation (11') of the threaded rod is axially mounted behind the first motor (60).

9. Linear drive device according to claim 5, characterized by the fact that the gear unit (13, 51, 52) is a toothed belt gearing unit.

10. Linear drive device according to claim 5, characterized by the fact that the gear unit is a friction wheel gear unit.

11. Linear drive device according to claim 5, characterized by the fact that one gear unit is a gear drive.

12. Linear drive device according to claim 1, characterized by the fact that the nut (15) is a ball rotating nut, and that the threaded rod is provided with a suitable thread.

13. Linear drive device according to claim 1, characterized by the fact that nut (15) is made of plastic.

14. Linear drive device according to claim 7, characterized by the fact that the drive tube is widened in a bell-shaped manner on its end (330) turned away from said second motor ($M_1$) and that a ball rotating nut (310) is housed in the widened portion of said drive tube.

15. Linear drive device according to claim 7, characterized by the fact that both said parts (1, 2) telescopically movable into each other are locked against turning by a lengthwise groove on the outer part (1) and at least one spring (200) arranged on the inner part (2).

16. Linear drive device according to claim 7, characterized by the fact that both said parts which can be shifted telescopically into each other are locked against turning by a large number of lengthwise grooves (202, 203) mounted from the outside on the inner part (2") and a corresponding number mounted on the outer part (1") from the inside.

17. Linear drive device according to claim 7, characterized by the fact that said parts (1', 2') telescopically movable into each other are provided with lengthwise grooves, forming raceways, mounted inside on the outer part (1) and outside on the inner part (2'), in which there are ball bearings (201) which assure said parts against rotation.

18. Linear drive device according to claim 7, characterized by the fact that both said parts, telescopically shiftable into each other, exhibit a polygonal cross sectional profile.

19. Linear drive device according to claim 7, characterized by the fact that the free end of the outer part is shiftably sealed against the inner part by a ring-shaped sealing element.

20. Linear drive device according to claim 1, characterized by the fact that all rotatable parts are contained in a housing (20, 30; 30,63; 1,2).

21. Linear drive device according to claim 1, characterized by the fact that the revolution speed of the two drive motors ($M_2$, $M_1$) differ only slightly in order to achieve a crawling, very slow linear motion when operated in the same rotational direction.

* * * * *